(12) United States Patent
Kirshenboim et al.

(10) Patent No.: US 9,590,928 B2
(45) Date of Patent: Mar. 7, 2017

(54) APPARATUS AND METHOD FOR HANDLING A MESSAGE

(71) Applicant: WorldMate, Ltd., Lod (IL)

(72) Inventors: Amir Kirshenboim, Tel Aviv (IL); Nadav Gur, Palo Alto, CA (US)

(73) Assignee: WORLDMATE, LTD., Lod (IL)

( * ) Notice: Subject to any disclaimer, the term of this patent is extended or adjusted under 35 U.S.C. 154(b) by 416 days.

(21) Appl. No.: 14/188,579

(22) Filed: Feb. 24, 2014

(65) Prior Publication Data

US 2014/0237383 A1   Aug. 21, 2014

Related U.S. Application Data

(63) Continuation of application No. 13/207,440, filed on Aug. 11, 2011, now abandoned.

(60) Provisional application No. 61/372,879, filed on Aug. 12, 2010.

(51) Int. Cl.
| | |
|---|---|
| G06F 15/16 | (2006.01) |
| H04L 12/58 | (2006.01) |
| G06F 3/0482 | (2013.01) |
| G06F 17/22 | (2006.01) |

(52) U.S. Cl.
CPC ............ H04L 51/02 (2013.01); G06F 3/0482 (2013.01); G06F 17/2235 (2013.01); H04L 51/18 (2013.01)

(58) Field of Classification Search
CPC ...... G06Q 10/02; G06Q 50/14; G06Q 10/025; G06Q 10/10; G06F 9/546; G06F 2209/547; H04L 51/18; H04L 51/02
See application file for complete search history.

(56) References Cited

U.S. PATENT DOCUMENTS

| | | | |
|---|---|---|---|
| 6,685,093 | B2 | 2/2004 | Challa et al. |
| 7,044,371 | B2 | 5/2006 | Dove et al. |
| 8,555,338 | B2 | 10/2013 | Gur et al. |
| 2002/0174185 | A1 | 11/2002 | Rawat et al. |
| 2004/0044674 | A1* | 3/2004 | Mohammadioun .... G06Q 10/10 |
| 2004/0240408 | A1* | 12/2004 | Gur ........................... G06F 8/61 370/328 |
| 2005/0109843 | A1 | 5/2005 | Dove et al. |
| 2005/0137916 | A1 | 6/2005 | McElhannon |
| 2005/0204011 | A1* | 9/2005 | Velayudham ....... H04L 29/1215 709/206 |
| 2005/0216824 | A1 | 9/2005 | Ferguson et al. |
| 2007/0016897 | A1 | 1/2007 | Todd |

(Continued)

OTHER PUBLICATIONS

Final Office Action for U.S. Appl. No. 12/852,488, mailed Jan. 17, 2013, 23 pages.

(Continued)

*Primary Examiner* — Moustafa M Meky
*Assistant Examiner* — Kidest Mendaye
(74) *Attorney, Agent, or Firm* — Foley & Lardner LLP

(57) ABSTRACT

A system for handling automated messages from a travel supplier includes a messaging client configured to receive an automated message generated by a remote travel supplier. The message comprises a link to a web address for completing a travel action associated with the link. A parsing unit configured to extract the link from the automated message, identify the travel action associated with the link, and store the extracted link and a representation of the travel action in a non-volatile memory device.

10 Claims, 5 Drawing Sheets

(56) References Cited

U.S. PATENT DOCUMENTS

| | | |
|---|---|---|
| 2007/0083602 A1* | 4/2007 | Heggenhougen ..... H04L 12/583 709/206 |
| 2007/0130463 A1 | 6/2007 | Law et al. |
| 2007/0220271 A1 | 9/2007 | Law |
| 2007/0226754 A1 | 9/2007 | Grabarnik et al. |
| 2007/0239494 A1 | 10/2007 | Stephens et al. |
| 2007/0244793 A1 | 10/2007 | Boesel |
| 2007/0294116 A1* | 12/2007 | Stephens ................ G06Q 10/00 705/5 |
| 2008/0196016 A1* | 8/2008 | Todd ....................... G06F 9/546 717/143 |
| 2008/0215383 A1 | 9/2008 | Sundt et al. |
| 2008/0222246 A1 | 9/2008 | Ebling et al. |
| 2009/0012824 A1* | 1/2009 | Brockway .............. G06Q 10/02 705/6 |
| 2009/0100367 A1 | 4/2009 | Dargahi et al. |
| 2009/0210262 A1* | 8/2009 | Rines ..................... G06Q 10/02 705/5 |
| 2009/0234844 A1 | 9/2009 | Kaehler et al. |
| 2010/0228577 A1* | 9/2010 | Cunningham ......... G06Q 10/10 705/5 |
| 2010/0258630 A1 | 10/2010 | Shenfield et al. |
| 2010/0269154 A1 | 10/2010 | Knowles et al. |
| 2011/0126141 A1 | 5/2011 | King et al. |
| 2011/0216064 A1 | 9/2011 | Dahl et al. |
| 2011/0239160 A1 | 9/2011 | Kirshenboim et al. |
| 2012/0042024 A1 | 2/2012 | Kirshenboim |
| 2012/0042371 A1 | 2/2012 | Gur et al. |
| 2012/0209840 A1 | 8/2012 | Gur |
| 2012/0330906 A1* | 12/2012 | Fredericks ............. G06Q 10/02 707/692 |
| 2013/0179423 A1 | 7/2013 | Gur et al. |

OTHER PUBLICATIONS

Final Office Action for U.S. Appl. No. 12/853,309, mailed Jan. 31, 2013, 7 pages.
Non-Final Office Action for U.S. Appl. No. 12/852,488, mailed Jul. 3, 2012, 18 pages.
Non-Final Office Action for U.S. Appl. No. 12/853,309, mailed Aug. 29, 2012, 6 pages.
Non-Final Office Action for U.S. Appl. No. 13/207,440, mail date Mar. 11, 2013, 11 pages.
Final Office Action for U.S. Appl. No. 13/207,440, mail date Sep. 24, 2013, 12 pages.
Final Office Action for U.S. Appl. No. 12/852,488, mailed Jan. 5, 2015, 22 pages.
Final Office Action for U.S. Appl. No. 12/852,488, mailed May 19, 2016, 24 pages.
Non-Final Office Action for U.S. Appl. No. 12/852,488, mailed Jun. 13, 2014, 10 pages.
Non-Final Office Action for U.S. Appl. No. 12/852,488, mailed Oct. 21, 2015, 22 pages.
Notice of Allowance for U.S. Appl. No. 12/853,309, mailed Jul. 22, 2013, 14 pages.
Notice of Allowance for U.S. Appl. No. 14/047,906, mailed Oct. 7, 2014, 15 pages.

* cited by examiner

APPARATUS AND METHOD FOR HANDLING A MESSAGE

CROSS REFERENCE TO RELATED APPLICATIONS

This patent application is a continuation of U.S. patent application Ser. No. 13/207,440 filed on Aug. 11, 2011, which claims the benefit of and/or priority to U.S. Provisional Patent Application No. 61/372,879, filed on Aug. 12, 2010, each of which are hereby incorporated by reference in their entireties.

BACKGROUND

Field of the Invention

The present invention relates to web-based services provided to users of computerized devices and overlaying uniform user interfaces over equivalent services in particular.

Discussion of the Related Art

Travel suppliers such as airlines typically provide customers a website and possibly a mobile website where customers can take actions like checking-in to a flight, selecting a seat, checking flight information and the like. Such customers are users of the travel suppliers websites or computerized applications and need to navigate to the site URL to use such services. In the site, customers are also required to navigate a menu system to reach the page of the desired action. While these services are generally comparable, each supplier has a separate website, at a different address (URL), with a different menu system and look-and-feel. Furthermore, the different settings of each site are changed from time to time by the suppliers. Typically, to reach such a site, users need to manually enter the URL, or click a link provided in a message such as an email or SMS to reach the specific address or perform a specific action within the site. Separate bookmarks or messages are required for each supplier or action. This lack of consistency is detrimental from the user's perspective as the user needs to learn how to navigate and use multiple different systems that essentially perform the same operations, and needs to manually retrieve the right addresses for each supplier and/or action.

In order to provide a user with one-click access to these services, a set of bookmarks or messages needs to be stored on the customer's mobile device or computerized device a-priori, taking into account all the possible travel suppliers that may provide such services. In such a system, all these addresses also have to be updated from time to time in case a provider is added or changes the location or structure of their mobile website. Also in such a case, specific information pertaining to a future reservation made by a traveler or a customer cannot be encoded as it is not known a-priori.

Alternatively, the user is required to either manually enter a URL in real time, or find the link in a message sent to him. Each of these actions is time consuming and relatively uncomfortable to perform on a mobile device.

SUMMARY OF THE INVENTION

It is an object of the subject matter to disclose a method of handling a message at a computerized device, comprising receiving the message, said message is generated by a machine in a structured format, the message comprises a link to a web address; extracting the link from the received message; associating the message to a known pattern to determine an action to be performed by a user of the computerized device according to the pattern associated with the received message; and associating the link with the action.

In some cases, the link comprises mark-up language. In some cases, the link is a deep-link enabling inputting information into a specific web page. In some cases, the link includes information that is required to be passed to fields in the web page. In some cases, the method further comprises a step of automatically filling fields in the web page. In some cases, the step of automatically filling fields in the web page is performed by a server.

In some cases, the method further comprises a step of displaying the action on a display unit of the computerized device. In some cases, the method further comprises a step of determining the time in which the action is suggested and displaying the action on the determined time. In some cases, the method further comprises a step of generating an icon on the display unit of the computerized device, said icon displays the action, such that pressing the icon activates one or more commands that perform the message in a manner transparent to the user.

It is another object of the subject matter to disclose a computer readable medium, storing a message handling program, to read and execute the steps disclosed above.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION OF THE PREFERRED EMBODIMENT

The subject matter discloses a system and method for providing a uniform user experience and simplifying user interaction by handling messages sent to a computerized device, such as a Personal computer or a mobile device. The messages may be sent from a supplier to a consumer associated with a message account such as an email account or an SMS account. The subject matter may be used for messages sent from travel suppliers, retails suppliers, entertainment suppliers and the like.

The method comprises a step of receiving a message concerning an action. The message may be received by an email client, at the email server, at an SMS server and the like. After detection of the message, the message is parsed to determine whether an action is contained in the received message. Such action may be checking in, making a reservation, updating reservation, paying, verifying a purchase, checking stock values, buying, selling and the like.

According to some exemplary embodiments of the subject matter, the message sent to the user contains a link. The link may be a standard URL link to a web page or another data representing an address. The link may be to a content provider, for example a website of the travel supplier. The website can alternatively be a computerized application available only upon receipt of the message from the supplier, not to any person surfing the internet.

20 After receiving the message that contains the link, the processor that handles the message associates the message with one or more actions. The actions may be described in the message itself. Alternatively, the action is derived from or identified by the data stored at the address targeted in the link. In such case, the processor retrieves data from the link target and determines the action according to the data stored at the link. A storage unit communicating with the processor stores a plurality of actions and settings related to the actions, such as formats and data fields. The storage unit may store identifiers of actions and link targets, such that a link target is associated with an action using the identifiers.

In some exemplary cases, the message is not associated with an action, but 30 includes links to actions as a by-product. In addition, the message is not processed to figure out the actions but to match to an existing pattern—in which the actions were already figured out. Rather, the specific URL for the specific action by the specific user is extracted.

Figure 1:
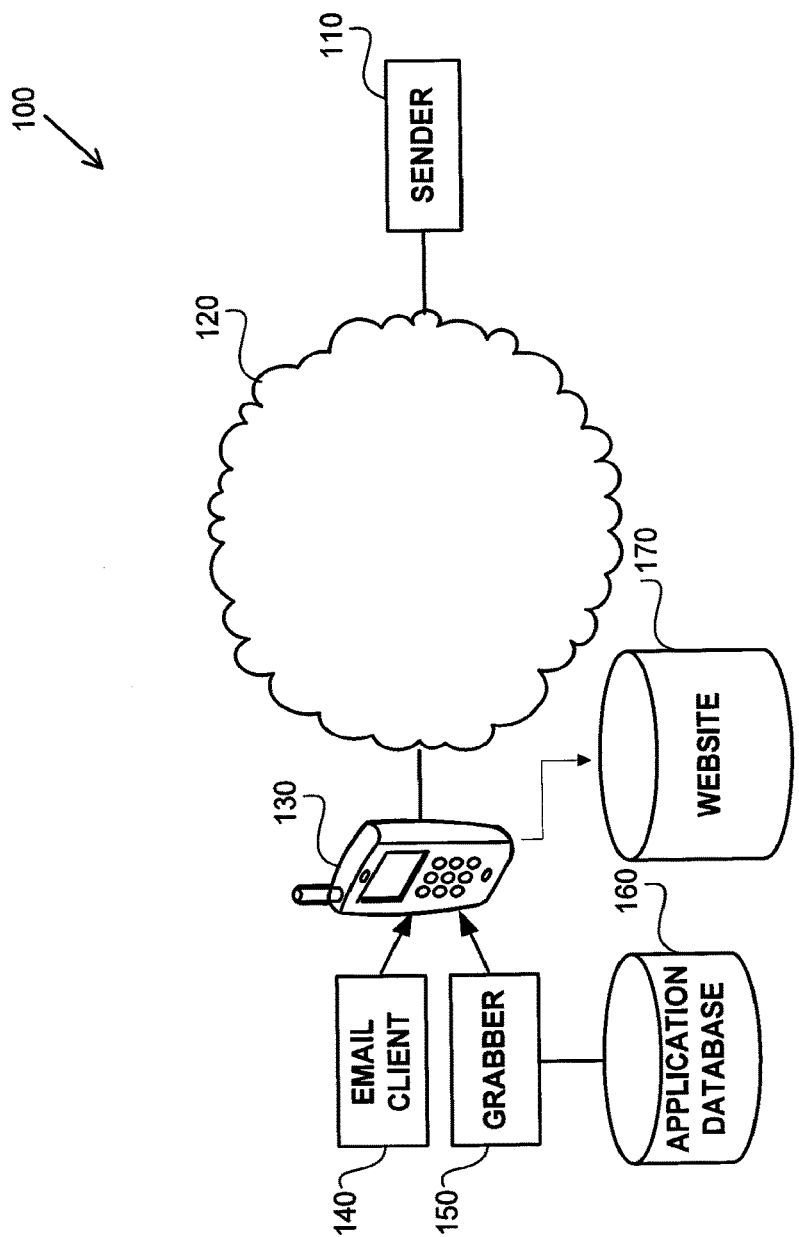
FIG. 1 shows a computerized environment for handling messages in a user's device, according to exemplary embodiments of the subject matter.

FIG. 1 shows a computerized environment for detecting messages in a user's device, according to exemplary embodiments of the subject matter. The computerized environment 100 comprises a sender 110 for sending messages to a receiver's device 130 via a network 120. The sender may be a colleague, a travel agency, a hotel, a theatre, a service provider, a retail manager or another person or entity related to an action to be performed by the user of the receiver's device 130.

The receiver's device 130 comprises a communication receiver, such as an email client 140 or another unit for detecting other messages such as SMS, MMS, instant messages and the like. The receiver's device 130 may also comprise a communication detector, such as a communication grabber 150, for detecting messages received at the communication receiver. The communication detector comprises a set of rules according to which a detected message is associated with a predetermined action, such as purchase of commodity. The grabber 150 listens to messages received at a user's account. The grabber 150 may also analyze the received message to decide how to handle it. If the grabber 150 is located at the receiver's device 130, the first step is determining whether the received message should be handled or not. In some cases, the second level parsing and the extraction of the data from the received message are performed at the server.

20 The communication detector may comprise a parser unit for parsing at least a portion of the detected message. The parsing unit may parse only a predetermined field or segment of the detected message, for example the sender field, the subject, the first 100 characters and the like. The parsing may include two phases. The first phase provides for parsing the message according to the domain from which the message was sent, for example from a domain listed in a storage connected to the communication grabber 150. Such storage includes a set of rules and domain names related to the predetermined field, such as domain names of travel agencies, car rental agencies, service providers and the like. The second phase of the parsing includes exclusion of keywords such as reminder and cancellation, detecting regular expressions on subject and attachment name, and searching in email body. The set of rules on the user's device 130 may be modified frequently or according to actions made by the user. Such modifications may result from periodic updates mechanism or pushed updates etc received from a central unit handling the rules. The user's device 130 also communicates with a website 170. The website 170 comprises a web page or an online application to which the link of the received message points.

Figure 2:
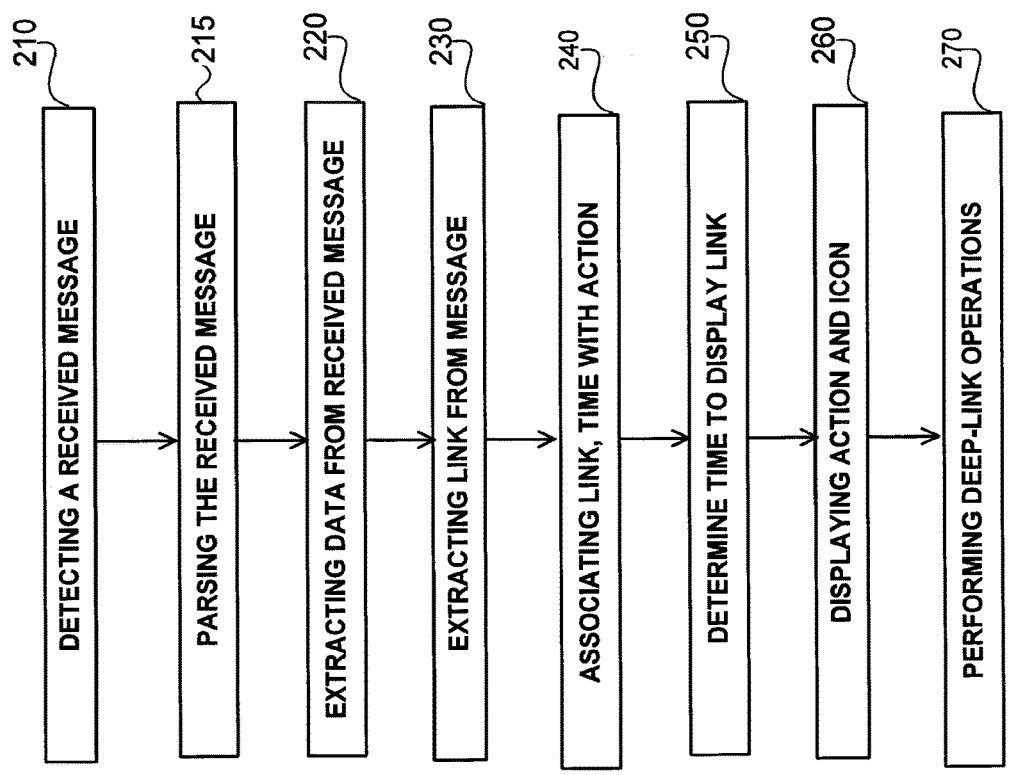
FIG. 2 shows a computerized method for handling messages at a user's device, to according to exemplary embodiments of the subject matter.

FIG. 2 shows a computerized method for handling messages at a user's device, according to exemplary embodiments of the subject matter. In step 210, the message is received at the user's device. The message may be an email, SMS, instant messaging communication and the like. The user's device may be a mobile device, a personal computer, laptop and the like. The message received at the user's device is generated by a machine, not by a person. The message may have a standard format sent to multiple users or recipients. In step 215, the received message is parsed by a parser. In some cases, the parser contains data related to the location of specific data fields in the message, when the message is provided in patterns.

In step 220, data is extracted from the received message. Such data may include time, action, supplier such as a car rental agency, prices and the like. In some cases, the content of the message is compared with a list of actions stored at the user's device or at a server performing the method of the disclosed subject matter. The list of actions may contain actions such as "update", "cancel", "check-in", "book", "buy", "change" and the like. In some other exemplary cases, the message is associated with a pattern of messages, such as a standard message from a specific company. The pattern is analyzed to associate an action with the data extracted from the pattern. As a result, the received message is associated with an action according to the pattern In step 230, a link contained in the received message is extracted from the message. The link may be a standard link to a web page or another data representing an address or a location in the website of an entity associated with the message. The entity associated with the message may be the sender or another supplier of services or goods offered or included in the message. For example, a message from a travel agency may include a link to a hotel website or a link to a hotel mobile application. The website can alternatively be a computerized application available only upon receipt of the message from the supplier, not to any person surfing the internet. In some cases, the message may 30 be compared to a known pattern, in which links to actions are embedded, to retrieve the specific links sent to the user in the message.

In step 240, the link and other data extracted from the received message are associated with an action. For example, when receiving an email message concerning a flight that requires the user to check-in, a link to check-in appears in the message. The action, check-in, also appears in the message. In some exemplary cases, the link and action are also associated with an event, such as the time a purchased item is to be delivered to the person who received the message. Such event may also be a flight.

In step 245, an icon is generated on the user's device. Generation of the icon may be performed at the user's device or by a server communicating with the user's device. The icon enables the user to perform the action extracted from the received message. The action may be performed by pressing the icon, as pressing the icon activates a command or several commands. Such commands may be filling data at a predefined address, sending a cancellation message and the like.

In step 250, a time may be associated with the action. The time is used to determine when to display the action associated with the received message. Such time may also be associated with the event, and with a general rule concerning the event. For example, when the message contains the action of checking in a flight, the flight time is relevant to the time the user is required to check-in. Such time may be 24 hours before the flight for suggesting the user to check-in. In some cases, the actions are displayed immediately after associated with the data extracted from the received message.

In step 260, the action is displayed to the user. The action may be displayed by an icon generated in step 245. The action may be displayed using an icon on the user's display device. Activating the action enables the user to directly point at the specific web page or web application without the requirement to look for the message, which in many cases is received weeks before the date of the action, or otherwise locate or enter the link. The format of the action displayed to the user may be generic. In such cases, displaying the action to the user when performing the action makes the format of the message irrelevant. In step 270, the link is opened using a browser. When the link is opened, a software agent in the computerized device, such as user's device 130, may fill data fields in the webpage in order to facilitate the action for the user. In some cases, the 30 link contains the data to be inputted in the data fields in the webpage. In some other cases, inputting data in the data fields is performed using a screen scraping method. The data inputted in the data fields may enable authentication of the user of the computerized device, may reduce the number of data fields to be inputted by the user and the like. The data automatically inputted in step 270 may be stored in the computerized device or in the application server, such as 160 of FIG. 1.

Figure 3:
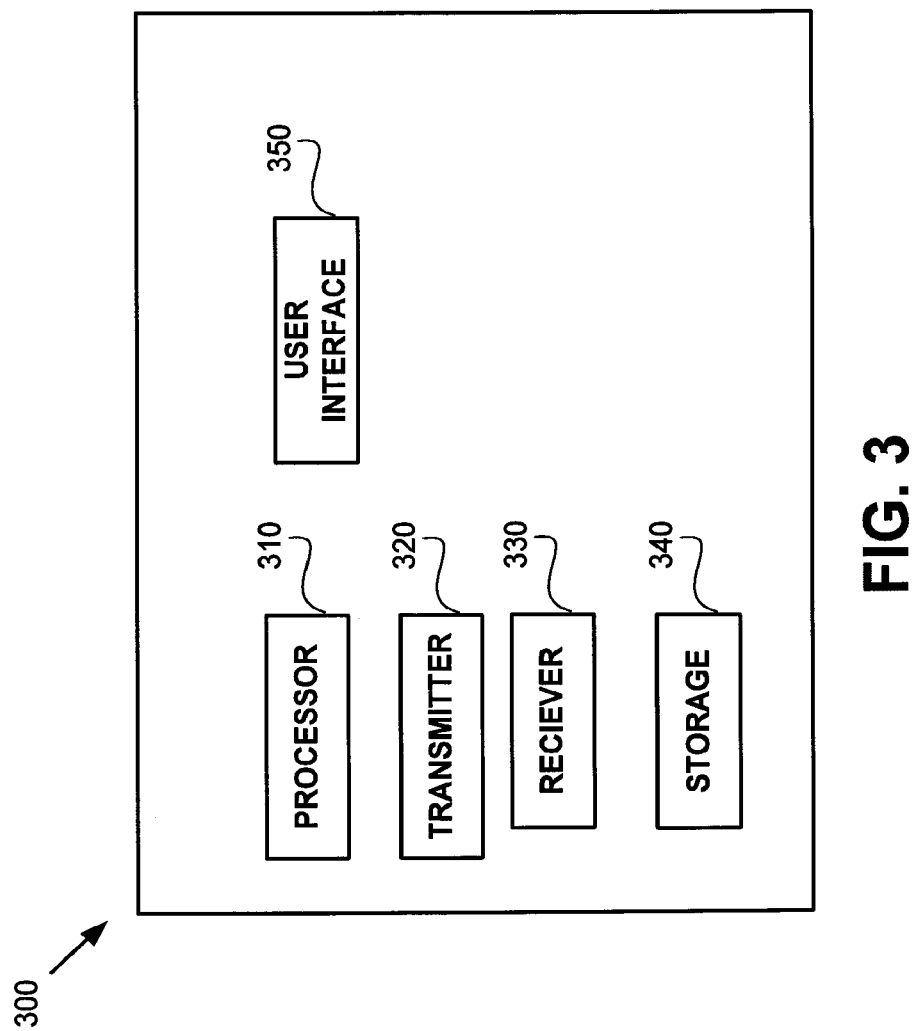
FIG. 3 shows a computerized system for handling messages at a user's device, according to exemplary embodiments of the subject matter.

FIG. 3 shows a computerized system for handling messages at a user's device, according to exemplary embodiments of the subject matter.

The system 300 comprises a receiver 330. The receiver 330 receives a new message at the message account of the user, for example an incoming SMS or an email message. The receiver 330 may listen to the email account of the user's device or to an email server associated with the user's email account. The receiver 330 may be implemented in a copy of the message account stored in the application server or in the user's computerized device. Upon receiving a new message to the user, the receiver 330 notifies a processor 310 of the system 300 that a message has been received. The receiver 330 may not be connected to the message account of the user, as in some cases the user of the computerized device actively sends the message to the system.

The processor 310 receives the message from the receiver 330 or retrieves the message from the message server. The processor 310 may parse the received message and extract the link from the message. The processor 310 may further determine which of a plurality of links is associated with the computerized device used. For example, the message may contain two or more links for performing the same action, such as "update", each meant to be used on a specific class of computerized device—for instance a desktop computer, a Smartphone and the like. In such case, the processor 310 determines the proper link according to the device in which the action is to be performed. The processor 310 may further extract an action from the message. Extracting the action may be performed by comparing the message against a known pattern. Extracting the action may also be performed by comparing data parsed from the message with a plurality of actions stored at storage 340. The processor 310 may also associate the extracted link and the action. Such association may be performed by a set of rules or by the content of the message. The processor 310 may also determine the time to use the link to perform the action. The time determined by the processor 310 may be used to 30 activate a reminder on the user's device to perform the extracted action. Such time may be 2 hours before the action, for example in case the action requires opening the link to register for a lecture, or 24 hours, for example in case the event is a flight and the action is checking in the flight.

The processor 310 may be connected to a storage unit 340 that contains rules concerning identifying a link and an action from the received message. In some exemplary cases, the storage unit 340 stores rules that are received from a server that may also extract data from the received message. Such rules received from the server concern extraction of content from messages and associating time with the action and the link. The rules may also be sent from an application server such as 160 of FIG. 1.

The system 300 may also comprise a transmitter 320 for transmitting messages to an entity external to the system 300. The transmitter 320 may alternatively send messages from a remote location such as an email server when the system 300 is located externally to the user's mobile device. The transmitter 320 may also send an alert in case the action is required at a specific time and the user did not perform it using the suggested link.

The system 300 may further comprise a user interface module 350. The user interface module 350 provides the user a display of the link. The user interface module 350 may display the link in a generic format or in a format related to the action or to the link, or according to a rule defined by the user or according to a rule stored in the storage unit 340.

Figure 4:
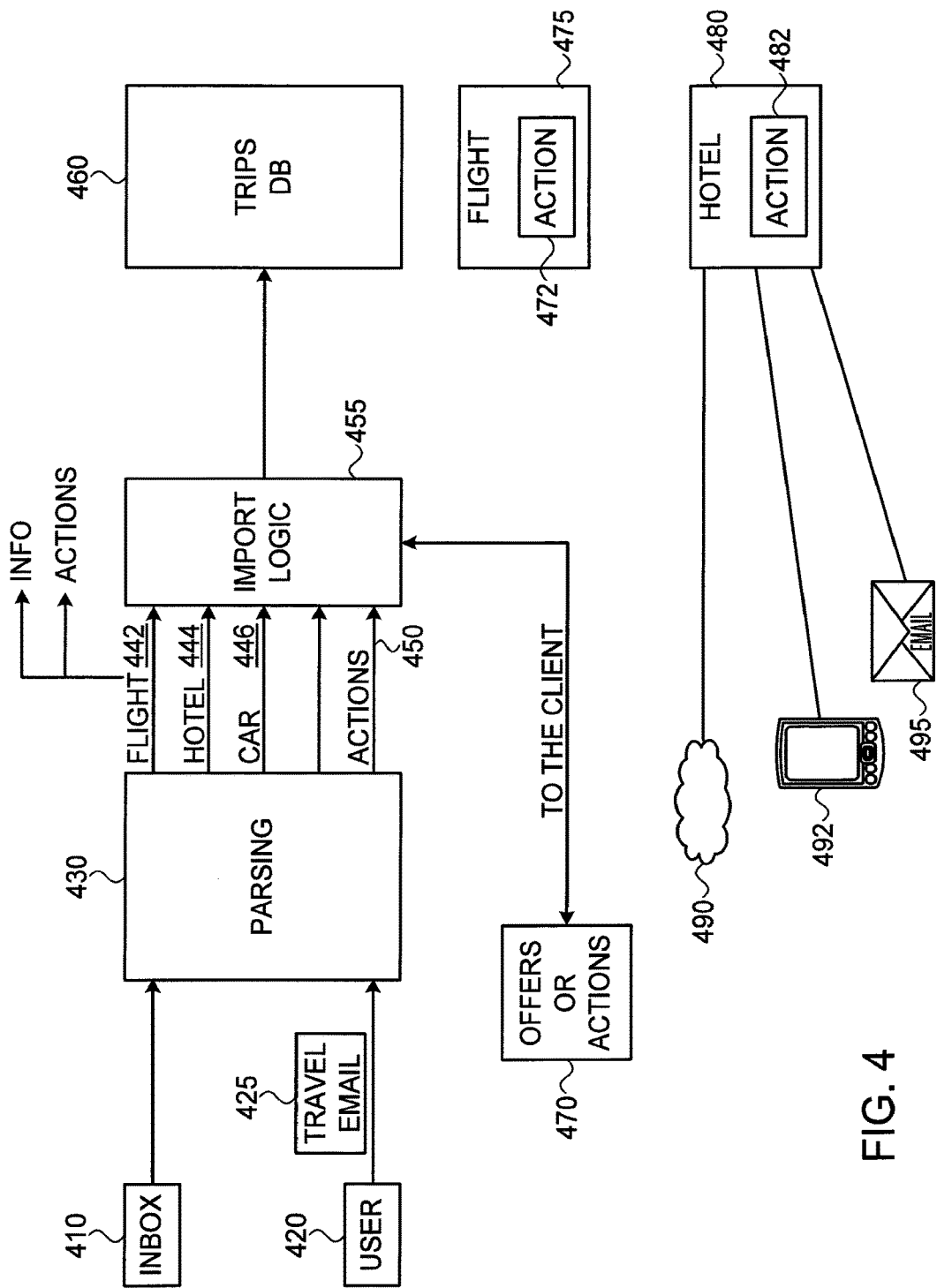
FIG. 4 shows a method for handling messages and components used to implement the method, according to exemplary embodiments of the disclosed subject matter.

FIG. 4 shows a method for handling messages and components used to implement the method, according to exemplary embodiments of the disclosed subject matter. The message is received at a user's inbox 410. The user's inbox 410 may reside at an email server. Alternatively or simultaneously, the message may be received at the user's computerized device 420, such as the user's mobile device. The received message may be a travel message 425 or any other message that involves an action. The received action may also relate to entertainment, culture, politics, sports, education and the like.

A parsing unit 430 parses the received message. The parsing may extract the action and other relevant data from the received message. Such relevant data may be time, sender identity, message type, computerized device used to perform the action, link 30 and the like. The parsing unit may receive a message at a predefined format. For example, travel agencies and flight companies send email messages at a predefined format. Such format may be stored at the parsing unit for extracting data fields from known patterns.

The parsing unit 430 determines whether the received message relates to a flight 442, a car registration 444, a hotel registration 446 and the like. The parsing unit 430 further extracts actions 450. The data extracted from the parsing unit 430 is transmitted to a logic unit 455. The logic unit 455 analyzes the data extracted from the parsing unit. For example, the logic unit 455 generates icons associated with the actions 450. The import logic 455 determines the actions 450 to be suggested to the user. The import logic further determines other offers to be suggested to the user 470, not only actions. Such io offers may relate to update or change parameters related to previous registrations. For example, in case the import logic 455 stores a hotel registration that fits the user more than a previous registration. For example, in case the user registered to a hotel and two weeks later the hotel has a better price, the import logic 455 may send a message to the user 470 with the relevant data and a link to an action of cancelling the previous order and performing a new one.

The import logic 455 may also be connected to a trip database 460. The trip database stores data related to the user's trips. In some cases, the import logic is a server communicating with multiple users and the trip database 460 stores data related to multiple users trips. The trip database 460 stores dates, prices, events, meetings and the like. Data records related to the trip may be stored at the trip database 460. Similarly, data related to other topics may be stored in other databases such as family database, work database, entertainment database and the like. The data records stored in the trips database 460 may be a flight record 475 and a hotel record 480. The flight record 475 is associated with flight action 472 and the hotel record 480 is associated with a hotel action 482. The user may review the suggested actions and perform such actions from several systems and architectures, such as email message 495, mobile application 492 and a website 490 associated with the method of the disclosed subject matter.

Figure 5:
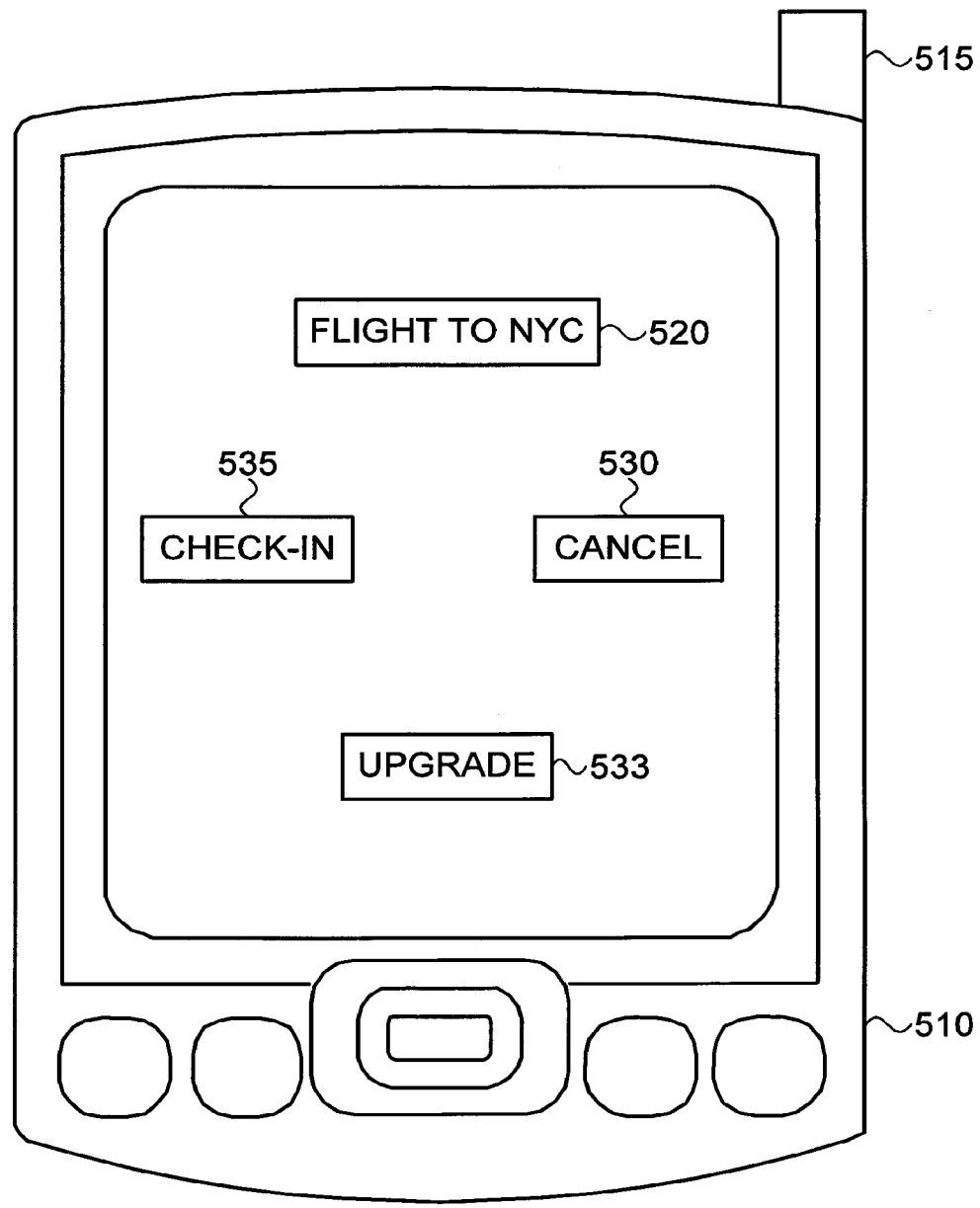
FIG. 5 shows a user's device behavior in for handling messages, according to exemplary embodiments of the subject matter.

FIG. 5 shows a user's device behavior in for handling messages, according to exemplary embodiments of the subject matter. The user's device 510 may be a 30 smartphone, a cellular phone, a PDA, a tablet, a laptop and the like. The user's device 510 comprises a receiver 515 used to receive signals. The receiver 515 may be an antenna. The signals may be messages handled by the method and system of the subject matter. The user's device 510 comprises a display unit. The display unit displays data to the user, for example time, received messages, files, and the like. The user may also use the display unit 540 to input data into the user's device 510, for example using a touch screen keyboard.

When a message is received at the user's device 510, an action is extracted from the message or identified by a computerized entity handling the received message. Along with the action, the computerized entity may also determine a time for performing the action, a link used to perform the action, and other data relevant for facilitating the user in performing the action.

The computerized entity may also determine to display an icon on the display of the user's device 510. Such icon may be used to perform the action in a manner transparent to the user. For example, when a "cancel" icon 530 is generated, the icon 530 is displayed immediately or at the time determined by the processor 310. When the user presses the "cancel" icon 530, a set of commands or operations is activated. The set of commands or operations may be stored at the user's device 510 or at a storage communicating with the user's device and used to facilitate performing of such actions. The user is not aware of any actual actions performed as part of the set of actions, for example browsing, filling data, activating an add-on software module and the like. Similarly, the user may press "upgrade" icon 533 and "check-in" icon 535 to perform these actions. The icons may also represent other actions, such as update, confirm and the like. Data relevant to the actions may be displayed in action display 520. For example, when the actions in icons 530, 533 and 535 relate to a flight, the action display 520 displays items related to the flight, such as the flight number and the like.

In some cases, the information obtained from the received message is not sufficient to perform the action, for example to send the data to a service provider. For example, a "check-in" link may include a user's e-ticket and last name, but the user may need additional information to complete the action. Such additional information may be the user's passport number or frequent flyer number. In some cases, the system may complete such additional information into an automated flow. The system of the 30 disclosed subject matter obtains the additional information from its own databases, for example a database storing information about users, a user profiles etc. The system may also obtain additional information related to other types of information, such as user preferences, for example 'window seat', 'meal type' and the like.

In some exemplary cases, the method of the subject matter also comprises a step of automatically performing the actions associated with the received message. For example, instead of asking the user to press an icon or a button in order to command execution of an action, the user may configure the system, either a mobile application or website, to automatically perform some actions. The system may use the data obtained from the received message and data stored at the system in order to perform the action. For example, the user may dictate automatic check-in 24 hours before flights. This to facilitates the user and saves time and energy.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A computerized method for handling automated messages generated by a remote travel supplier, the method comprising:
  receiving, at a user device, an automated message generated by a remote travel supplier, wherein the message comprises a link to a web page through which a travel action associated with the link can be performed, wherein the link comprises information designated for a first data field of the web page;
  parsing, by the user device, the automated message, wherein parsing the automated message includes:
    determining whether the automated message includes a plurality of links associated with a single travel action;
    automatically selecting one of the plurality of links in response to a determination that the automated message includes a plurality of links associated with a single travel action, wherein the link selection is based on a characteristic of the user device with which the associated action is to be performed;
    extracting the selected link from the automated message; identifying the travel action associated with the extracted link; extracting the information from the extracted link; and
    identifying the first data field of the web page for which the extracted information is designated;
  automatically storing the extracted link and a representation of the travel action associated with the extracted link in a local non-volatile memory of the user device;

automatically displaying a user interface on a display of the user device, wherein the user interface prompts a user for feedback regarding whether to perform the travel action; and automatically performing, by the user device, the travel action in response to positive user feedback received via the user interface, wherein performing the travel action comprises:

using the extracted link to automatically load the web page through which the travel action can be performed in a browser running on the user device;

automatically filling the first data field of the web page with the information designated for the first data field;

determining whether the web page through which the travel action can be performed requires additional information not included in the automated message;

identifying a second data field of the web page requiring the additional information and a type of additional information required by the second data field in response to a determination that the web page requires additional information not included in the automated message;

automatically retrieving, from the local non-volatile memory of the user device, the additional information required for performing the travel action; and automatically filling the second data field using the additional information.

2. The method according to claim 1, wherein parsing the automated message further includes determining a time for performing the travel action, the method further comprising:

automatically storing a representation of the time for performing the travel action in the local non-volatile memory of the user device, wherein the user interface is displayed in response to a determination, by the user device, that a current time is the time for performing the travel action.

3. The method according to claim 1, wherein the link is a deep-link enabling inputting the information included in the link into the first data field of the web page, wherein the method further includes automatically storing the extracted information and an indication of the first data field for which the extracted information is designated in the local non-volatile memory of the user device.

4. The method according to claim 1, wherein performing the travel action comprises automatically checking in for a flight via the web page.

5. The method according to claim 1, wherein the step of automatically filling the first data field of the web page is performed by a remote server in response to a request received from the user device.

6. A system for handling automated messages from a travel supplier, the system comprising:

a messaging client configured to receive an automated message generated by a remote travel supplier, wherein the message comprises a link to a web page through which a travel action associated with the link can be performed, wherein the link comprises information designated for a first data field of the web page;

a parsing unit configured to:

determine whether the automated message includes a plurality of links associated with a single travel action, automatically select one of the plurality of links in response to a determination that the automated message includes a plurality of links associated with a single travel action, wherein the link selection is based on a characteristic of a device with which the associated action is to be performed, extract the selected link from the automated message, identify the travel action associated with the extracted link, extract the information from the extracted link, identify the first data field of the web page for which the extracted information is designated, and store the extracted link and a representation of the travel action in a non-volatile memory device; and a logic unit configured to cause a user interface to be displayed on a display of a user device, wherein the user interface prompts a user for feedback regarding whether to perform the travel action wherein the logic unit is configured to automatically perform the travel action in response to positive user feedback received via the user interface, wherein performing the travel action comprises:

using the link to automatically load the web page through which the travel action can be performed in a browser running on the user device, automatically filling the first data field of the web page with the information designated for the first data field, determining whether the web page through which the travel action can be performed requires additional information not included in the automated message, identifying a second data field of the web page requiring the additional information and a type of additional information required by the second data field in response to a determination that the web page requires additional information not included in the automated message, automatically retrieving, from the non-volatile memory device, the additional information required for performing the travel action, and automatically filling the second data field using the additional information.

7. The system of claim 6, wherein the messaging client, parsing unit, and logic unit are components of the user device;

wherein the extracted link and the representation of the travel action associated with the link are stored in a local non-volatile memory of the user device; and wherein the user device is configured to display the user interface without requiring an active network connection at a time the user interface is displayed.

8. The system of claim 6, wherein the messaging client and parsing unit are components of a remote server and wherein the logic unit is a component of the user device;

wherein the remote server is configured to store the extracted link and a representation of the action associated with the link in a local non-volatile memory of the user device; and wherein the user device is configured to display the user interface without requiring an active network connection at a time the user interface is displayed.

9. The system of claim 6, wherein the messaging client and logic unit are components of user device and wherein the parsing unit is a component of the remote server;

wherein the user device is configured to determine whether a message received at the messaging client is a travel related message and relay the message to the remote server in response to a positive determination;

wherein the remote server is configured to extract the link from the automated message, identify the travel action associated with the link, and store the extracted link and a representation of the travel action in a local nonvolatile memory of the user device; and
wherein the user device is configured to display the user interface without requiring an active network connection at a time the user interface is displayed.

10. The system of claim 6, wherein the messaging client, parsing unit, logic unit are components of a remote server;
wherein parsing unit is further configured to determine a time for performing the travel action,
wherein the extracted link, a representation of the travel action associated with the link, and the time for performing the travel action are stored in a trips database accessible by the remote server;
wherein the logic unit is configured to cause the user interface to be displayed on the user device in response to a determination, by the remote server, that a current time is the time for performing the travel action.

* * * * *